March 14, 1961

O. G. WILLIAMS

2,975,281

METHOD AND APPARATUS FOR MEASURING WALL THICKNESS

Original Filed Aug. 1, 1947

INVENTOR.
ORLAN G. WILLIAMS
BY
Mellin and Hanscom
ATTORNEYS

March 14, 1961  O. G. WILLIAMS  2,975,281
METHOD AND APPARATUS FOR MEASURING WALL THICKNESS
Original Filed Aug. 1, 1947  5 Sheets-Sheet 2

INVENTOR.
ORLAN G. WILLIAMS
BY
Mellin and Hanscom
ATTORNEYS

March 14, 1961     O. G. WILLIAMS     2,975,281
METHOD AND APPARATUS FOR MEASURING WALL THICKNESS
Original Filed Aug. 1, 1947     5 Sheets-Sheet 4

INVENTOR.
ORLAN G. WILLIAMS
BY
*Mellin and Hanscom*
ATTORNEYS

FIG_9
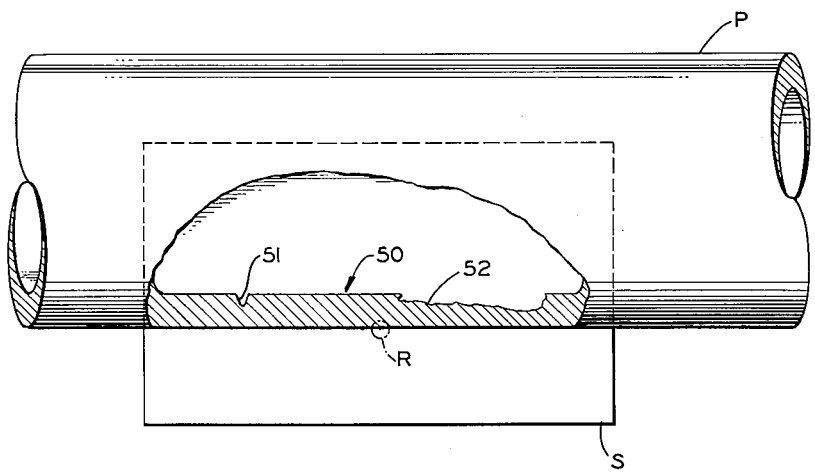
FIG_10
INVENTOR.
ORLAN G. WILLIAMS
BY
ATTORNEY

United States Patent Office 2,975,281
Patented Mar. 14, 1961

2,975,281
METHOD AND APPARATUS FOR MEASURING WALL THICKNESS

Orlan G. Williams, 1086 Michigan Ave., San Jose, Calif.
Substituted for abandoned application Ser. No. 765,446, Aug. 1, 1947. This application May 28, 1956, Ser. No. 589,359

4 Claims. (Cl. 250—65)

The present invention pertains to the measurement of wall thickness, and more particularly to measuring the thickness of pipe walls and similarly curved objects.

This application is a substitute for my prior abandoned application Serial No. 765,446, entitled "Method and Apparatus for Measuring Wall Thickness," filed August 1, 1947.

In the interests of safety, it is essential for the thickness of pipes and other fluid carrying and containing elements to be determined regularly for the purpose of detecting undue corrosive and erosive effects therein which may weaken the structures to a point requiring their replacement. In some industries, such as petroleum refining, the relatively high operating temperatures and pressures require constant vigilance against leakage and cracking of fluid containing elements, to avoid costly shut-downs and the hazards of explosions and fires.

The determination of the wall thickness of pipes and containers by calipering their inside and outside diameters is obviously a time consuming and costly operation, since it requires substantial dismantling of the industrial equipment and entails its removal from service. Accordingly, it is an object of the present invention to provide an improved method and apparatus for measuring the thickness of the wall from one side only. In a more limited aspect, the invention contemplates the accurate and convenient measuring of the thickness of a pipe or similar object from its exterior only, without necessitating the dismantling of the equipment.

In the use of a source of radiation (such as radium or a radioisotope) for obtaining the delineations of an object on the sensitized surface of a film or screen, the outline of the object may be lacking in sharpness because of the physical dimensions of the source employed. Theoretically, from a mathematical consideration, a point source would provide a sharply defined image, but the amount of gamma ray or X-ray radiation would then be relatively small, requiring considerable exposure time of the film, particularly upon passage of the rays through relatively thick walls. Moreover, practical difficulties, such as entailed in manufacturing and handling, require the radium or other radioactive source to have ample dimensions, from which rays emanate along a substantial surface, rather than a point, all of which militate against the obtaining of a distinctly outlined image on the film or screen.

Accordingly, another object of the invention is to provide an apparatus embodying a source of radiation of substantial dimensions, capable of outlining an image with greater sharpness and clearness than heretofore obtainable.

It has been proposed heretofore to employ radiation from a radioactive material such as radium, in conjunction with a radiation detector such as a Geiger counter for the purpose of measuring wall thickness. Thus, radiation from a suitable source, such as radium, is caused to pass tangentially through a pipe onto a detector. Electric current produced in the detector by incident radiation is amplified by suitable means to give a visual signal which, by suitable calibration, can be converted to wall thickness.

This technique has the advantage of using penetrative radiation whose intensity is a function, among other things, of the thickness of absorptive material interposed between the source of radiation and the detecting element. Thus, assuming that a pipe of homogenous composition is interposed between a source of radiation and a radiation detector such as a Geiger counter, and assuming a fixed geometric relationship between the pipe, the source of radiation and the detector, the aforesaid method will create a signal which is a function of wall thickness and which can be converted to wall thickness by calibration.

This method, however, is subject to several serious disadvantages among which may be mentioned the following:

The aforesaid method requires calibration for each metal or alloy because different metals and alloys have different absorption capacities. Also, the method is not capable of giving a visual, pictorial representation of the pipe wall. Also, it is applicable only to a short length of pipe.

It is an object of the present invention to provide improved apparatus and an improved method whereby thickness of pipe walls and the like can be determined by means of radiation, employing the principle of absorption of radiation by interposed material in proportion to the thickness thereof, such method, however, obviating disadvantages of prior methods employing this principle.

More particularly it is an object of the present invention to provide apparatus and a method of the character described for determining wall thickness, particularly the thickness of pipe walls, which employs penetrative radiation such as that from radium or a radioisotope, and which also employs photographic means for determining pipe thickness directly and visually.

These and other objects of the invention will be apparent from the ensuing description and the appended claims.

In its general aspects, the invention contemplates the provision of a source of radiation on the exterior of a curved object, such as a pipe, and a photosensitive film or screen, also on the exterior of the pipe, the latter and the radiation source being disposed with respect to the pipe in a predetermined geometrical arrangement, such that penetrative radiation acting tangentially of the external and internal surfaces of the pipe or curved object define an outline or pattern on the film surface or screen which is a direct function of the thickness. The source of radiation is preferably so shaped as to produce a minimum of divergence of rays tangent to the internal surface of the curved object, and also of rays tangent to its external surface; thus providing a distinct and sharp outline on the film or screen.

The invention is exemplified in the following description and illustrated by way of example in the accompanying drawings, in which:

Figure 9 is a view of a pipe and a sensitive film as "seen" by the source of radiation in the apparatus and method of the invention, the pipe being broken away to reveal the manner in which the source of radiation source "sees" irregularities in the pipe wall.

Figure 10 illustrates a photograph of the pipe wall section of Figure 9, as it would be produced by the present invention.

Figure 1:
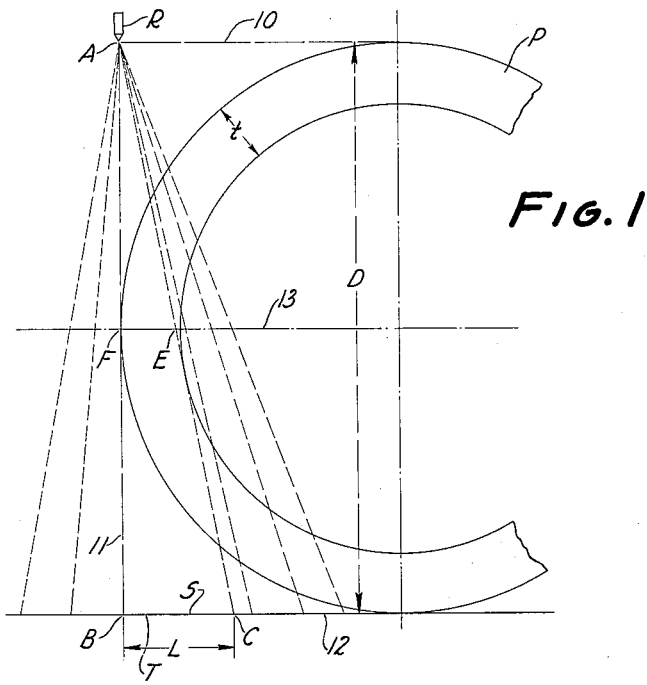
Figure 1 is a diagrammatic view of one embodiment of the invention.

In Figure 1, it is desired to measure the wall thickness of a pipe P having a known external diameter D. A source of radiation R, such as a radium needle, may be placed with its focal point or spot A at the intersection of two planes 10, 11 tangent to the periphery of the pipe and at right angles to each other, the axis of the radium needle R lying in one of the planes 11. The sensitive surface S of a film or screen T may be placed in a plane 12 diametrically opposed to the first-indicated plane 10 and tangent to the exterior of the pipe, the sensitive surface S being perpendicular to the radium needle axis. By virtue of the arrangement described, the distance between the focal point A of the radium needle R and the surface S of the film T is equal to the external or outside diameter D of the pipe P, whose wall thickness $t$ is to be determined.

The source of radiation, R, is indicated as a radium needle. However, it will be apparent that other sources of penetrative radiation capable of penetrating the pipe wall and of acting on and developing a latent image in photographic film may be employed for the purpose. Thus, various radioisotopes such as cobalt 60 and cesium 137 may be employed in place of radium. Hereinafter, for simplicity's sake, radium will be referred to but it will be understood that other radioactive materials may be employed instead.

Radiation or rays from the radium needle R project in all directions, including a general direction toward the film T, the rays passing through space, as to the left of the pipe (as seen in Figure 1), having a much greater exposure effect than the rays penetrating and passing through the material of the pipe. As a result, a distinct reference point or mark B is made on the film by a ray emanating from the focal point of the radium source and tangent to the external surface of the pipe. The penetrative rays to the right of the external tangent ray passing through the pipe material have a progressively lesser effect on the sensitized film surface S, because of the greater wall thickness through which they must penetrate, producing a decreasing shadow on the sensitive film. This shadow is the lightest where a ray tangent to the inside surface of the pipe strikes the film since the greatest pipe thickness is traversed by such rays. To the right of the inner surface, the rays pass through a lesser total wall thickness, and thus expose the film to a much greater degree, the shadow on the film becoming progressively darker. Accordingly, a second reference line or mark C is made on the film where the ray tangent to the inner surface of the pipe strikes the sensitized film surface S, such indication being the transition of the shadow or image on the film from lighter to darker. Similarly, the indication B by the external tangent ray is designated by the transition of the projected image between lighter and darker.

A projected image bearing a definite relation to the pipe wall thickness is thus delineated on the sensitized surface of the film, bounded by a ray tangent to the external surface of the circular pipe, and by another ray tangent to the inner surface of the curved pipe. The distance L on the film between these two reference lines or marks B, C bear a definite relationship to the pipe wall thickness $t$.

It is to be noted that the focal point A of the source of radiation R and the outlines B, C, formed on the film by the outer and inner tangent rays lie at the apices of a right triangle, with the ray AB tangent to the external surface of the pipe (one leg of the triangle) being equal to the outside diameter D of the pipe, the other leg BC of the right triangle being the length L of the image obtained upon the film, and the hypotenuse AC being the length of the internal tangent ray. The pipe wall thickness $t$ may be measured along a radial plane 13 parallel to the upper and lower planes 10, 12, and this thickness is approximately one-half the length L of the image obtained on the film T. For certain purposes in which the pipe wall thickness need not be determined with accuracy, and particularly where thickness measurements of relatively thin wall pipe is desired, the pipe wall thickness $t$ is substantially one-half the length L of the image outlined on the film, because of the similar right triangular relationship existing between the large triangle drawn between the points ABC and the small triangle drawn between the points AFE.

Mathematically exact determination of the pipe wall thickness may be obtained from the relationship of triangles set forth above, through development of a convenient formula. By determining the length L of the image obtained on the film surface S, the actual wall thickness of the pipe can be accurately determined through the use of such formula.

Figure 2:
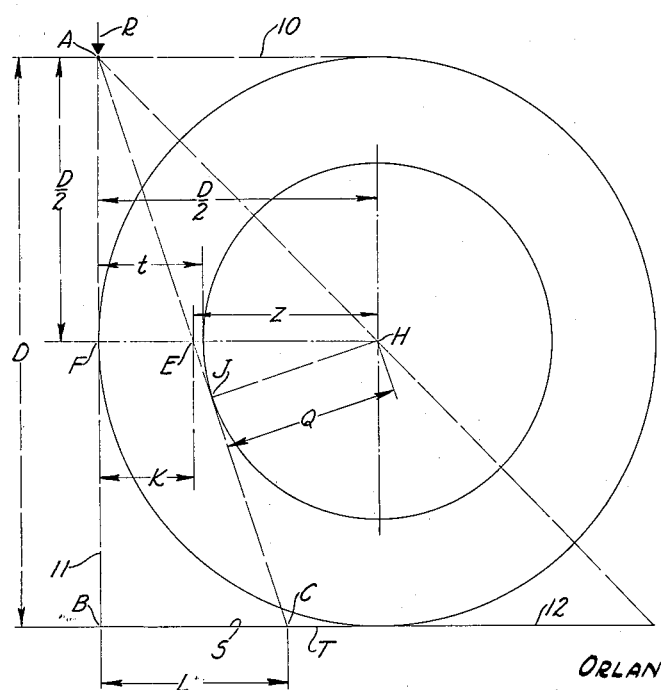
Figure 2 is a view similar to Figure 1, used in connection with the development of a formula for obtaining the exact wall thickness of a curved object.

The mathematical development of the formula will be understood from a configuration of Figure 2, in which the right angular relationship between the radiation source R and film T with respect to the outside and inside surfaces of the pipe P has been depicted in exaggerated fashion for purposes of clarity. As in Figure 1, the source R lies at the intersection A of two tangent planes 10, 11 at right angles to each other and the film T lies in a plane 12 tangent to the pipe and diametrically opposed to the first-mentioned plane 10. The ray from the source R tangent to the exterior of the pipe is indicated by the line AB and is at right angles to the film surfaces S. The hypotenuse AC of the right triangle extends from the source R and is tangent to the inner surface of the pipe. Another line HJ can be drawn from the axis of the pipe to the tangent point of the hypotenuse AC, and this line, obviously, is the inside radium Q of the pipe.

It is desired to determine the wall thickness $t$ of the pipe, knowing the length L of the projected image on the film T. By referring to the Figure 2, the following symbols will be noted:

$D$ = the outside diameter of the pipe
$L$ = the length of the projected image on the film
$K$ = one-half of the projected image = $L/2$
$t$ = the wall thickness of the pipe
$Q$ = inside radius of the pipe = $\frac{D}{2} - t$
$Z = \frac{1}{2}D - K$ From the drawings, it is apparent that the triangle AFE is similar to the triangle HJE. Accordingly by proportion:

$$\frac{AF}{HJ} = \frac{AE}{HE}$$

According to Figure 2:

$$AF = \frac{D}{2}$$

$$HJ = Q = \frac{D}{2} - t$$

$$HE = Z = \frac{D}{2} - K = \frac{D}{2} - \frac{L}{2} = \frac{D-L}{2}$$

$$AE = \sqrt{\overline{AF}^2 + \overline{FE}^2} = \sqrt{\left(\frac{D}{2}\right)^2 + K^2}$$

and since $$K = \frac{L}{2}$$

$$AE = \tfrac{1}{2}\sqrt{D^2 + L^2}$$

substituting the above values in the foregoing proportion:

$$\frac{\frac{D}{2}}{\frac{D}{2}-t} = \frac{\tfrac{1}{2}\sqrt{D^2+L^2}}{\frac{D-L}{2}}$$

solving for the pipe wall thickness, it is found that:

$$t = \frac{D}{2}\left(1 - \frac{D-L}{\sqrt{D^2+L^2}}\right)$$

From the foregoing formula, it is apparent that the wall thickness $t$ can be determined, since the external diameter D of the pipe is known, and also the length L of the projected image. Suitable tables or graphs may be prepared to enable the pipe thickness to be obtained very readily, once the outside pipe diameter D and the length L of the projected image are known.

It is not essential for the axis of the radium needle R, or other radiation source, to be disposed in a plane 11 tangent to the external surface of the pipe and at right angles to the film surface S, in order to determine the wall thickness approximately, but with reasonable accuracy. The source R could be disposed slightly to the right or left of the position disclosed in Figure 1, and a fairly accurate indication of the pipe wall thickness obtained upon the film. The right angular relationship, however, is preferred, since it enables the exact wall thickness measurement to be obtained whenever desired.

Similarly, the film surface S need not lie exactly in the lower tangent plane 12. It may be slightly above or below this plane and still give a fairly accurate indication of the wall thickness of the pipe, particularly when it is merely desired to ascertain corrosive or erosive effects upon the interior of the pipe, to be assured that the pipe wall thickness is still ample for the safe functioning of the equipment.

Figure 3:
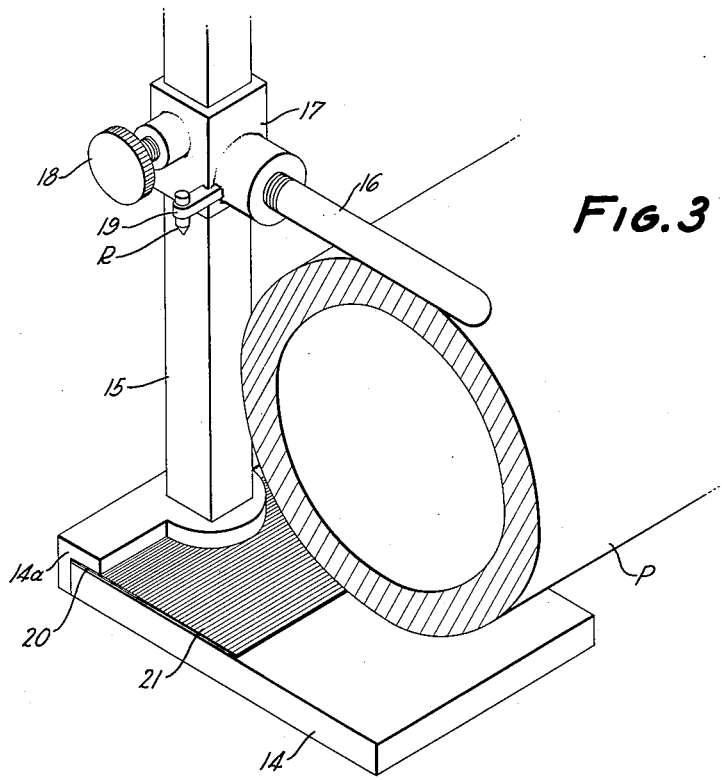
Figure 3 is an isometric projection, partly in section, of one form of apparatus employable in measuring the thickness of a pipe wall.

An apparatus for readily locating the source of radiation R and film T with respect to the pipe is disclosed in Figure 3.. Specifically, it includes a base 14 adapted to contact the outside diameter of the pipe P, and a column 15 extending at right angles from the base. The column has an adjustable projection or rod 16 extending from a head 17 parallel to the base, which may be clamped to the column 15 by a thumbscrew 18 threaded through the head 17 and adapted to bear against the outer surface of the column. Loosening of the thumbscrew enables the rod 16 to be shifted to and from the base 14, depending upon the external diameter of the pipe whose wall thickness is to be measured.

With the thumbscrew 18 loosened, the clamp device is placed over the pipe P until the base 14 and column 15 are tangent to its periphery, whereupon the head 17 may be lowered on the column until the rod 16 engages the exterior of the pipe, the rod then being clamped in such position by tightening thumbscrew 18. A radium capsule R may be inserted within a lug 19 secured to the head 17 in such position as to dispose the capsule axis substantially in the same plane as the inner tangent surface of the column 15, with its focal point in substantially the same plane as the underside of the rod 16, thus disposing the parts in the relationship illustrated diagrammatically in Figures 1 and 2.

The base 14 has an upper portion 14a extending slightly above its lower portion and defining a space 20 into which a film pack 21 may be placed for disposition under the pipe P. The rays emanating from the radium capsule R and tangent to the external periphery and inner surface of the pipe may then delineate the projected image on the film, as described above. The film is exposed for the required time and is then removed for development and observation. From the length L of the projected image obtained on the film, the wall thickness can be determined either approximately, by dividing the projected image length in half, or accurately by the use of the above formula or tables or graphs derived therefrom.

Figure 4:
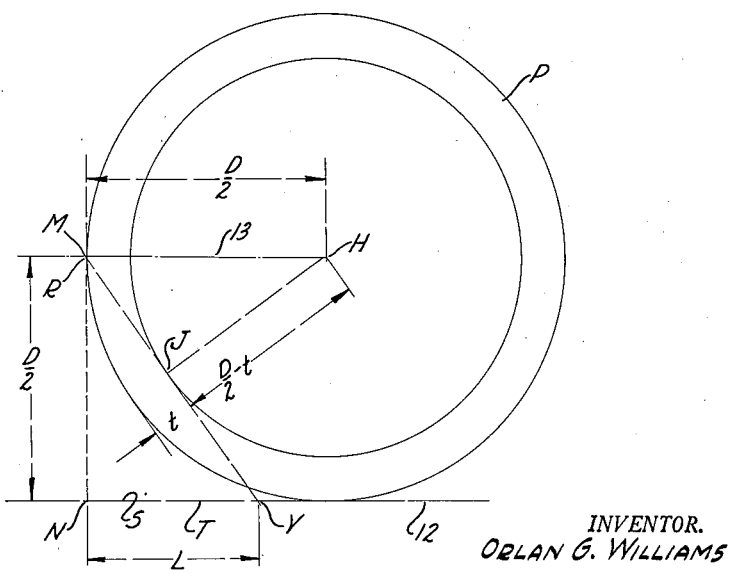
Figure 4 is a diagrammatic view of another embodiment of the invention.

Since the intensity of the radiation varies inversely as the square of the distance of the source from the object, it is desired to hold such radiation source as close to the object as possible. The provision of the radium needle R at the focal point A indicated above is reasonably close to the pipe whose wall thickness is to be determined, and sharp delineations B, C of the inner and outer tangent lines or planes on the film T are obtainable. Figure 4 illustrates the location of the radium capsule still closer to the object to be penetrated by the radioactive waves, enabling the exposure time of the film to be still further decreased.

The radium needle R, or other force of radioactivity, is placed with its axis parallel to the pipe axis H and lying in a radial plane 13 parallel to the lower plane 12 tangent to the external surface of the pipe, and on which the photosensitive surface of the film to be exposed may lie. The rays from the radium needle penetrate the pipe, the rays tangent to the inner surface of the pipe marking an inner line V on the surface of the film, and the rays passing through the air directly from the radium needle tangent to the exterior of the pipe providing a further outer marking N on the sensitized surface of the film. Thus, lines of demarcation are obtained on the film of the projected image of the inner and outer tangent rays, the image having a length L between the inner and outer markings V, N. The pipe wall thickness $t$ may be determined accurately through use of a suitable formula.

The same general nomenclature is used in the formula hereinbelow as used above in connection with the other diagrammatic illustrations. It is to be noted that similar right triangular relationship exists between a triangle formed by the focal point M of the radium needle and the delineations on the film N, V, and a right triangle formed between the focal point M, the axis of the pipe H and the point of contact J of the tangent ray MV with the inner circle of the pipe. By similar triangles $$\frac{MV}{MN} = \frac{MH}{HJ}$$

Designating such proportions in terms of the diameters, length of the projected image and thickness of the pipe, it will be found that the following relationship exists:

$$MN = \frac{D}{2}$$

$$MV = \sqrt{\overline{MN}^2 + \overline{NV}^2} = \sqrt{\frac{D^2}{4} + L^2}$$

$$HJ = \frac{D}{2} - t$$

$$MH = \frac{D}{2}$$

substituting the foregoing values in the above proportion:

$$\frac{\sqrt{\frac{D^2}{4}+L^2}}{\frac{D}{2}} = \frac{\frac{D}{2}}{\frac{D}{2}-t}$$

solving for $t$ it is found that $$t = \frac{D}{2}\left(1 - \frac{D}{2\sqrt{\frac{D^2}{4}+L^2}}\right)$$

The formula given above may be utilized in determining accurately the wall thickness of the pipe, or such formula, or any other suitable formula that might be developed, may be employed in computing tables and in the preparation of suitable graphs, enabling the wall thickness to be determined rapidly simply through knowledge of the outside diameter D of the pipe and the length L of the projected image obtained on the film.

Figure 5:
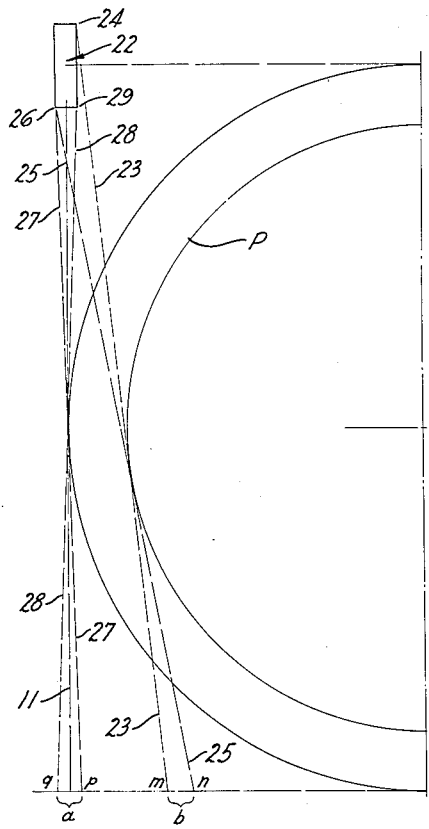
Figure 5 is a diagram illustrating the divergent tangent rays from a generally cylindrical radiation source striking a radiation sensitive member.

As indicated above, a sharp outline of the projected image is obtainable upon the film if the radium source 10 R, or other source of radioactivity, were confined to a point. Actually, the radium capsule must have some physical dimensions in order to obtain a sufficient quantity of penetrative radiation for obtaining the projected image on the film. Since rays are emanating in all directions from the source of radiant energy, such as radium, a clear and sharp image is not obtainable on the film. By reference to Figure 5, a radium capsule 22 is indicated diagrammatically of short cylindrical form, with its axis lying in the tangent plane 11. It is apparent that a penetrative ray 23 from the upper inner edge 24 of the cylinder extends tangent to the inner wall of the pipe to provide an indication on the film designated by the letter $m$ on the film. Similarly, an inner tangent ray 25 from the lower outer edge 26 of the cylinder makes another mark $n$ on the sensitized surface of the film. In addition, a ray 27 from the lower outer cylinder edge 26 tangent to the outer surface of the pipe provides a reference mark $p$ on the film, and another outer tangent ray 28 from the inner lower edge 29 of the radiation source makes another reference mark $q$ on the sensitized surface of the film.

Accordingly, it is seen that radiation is originating from a surface rather than a point source, and that the external tangent rays 27, 28 are providing an indistinct length or area "$a$" on the sensitized film, indicating the outer margin of the pipe, and the inner tangent rays 23, 25 are providing an indistinct reference length or surface "$b$" on the film, indicative of the inner surface of the pipe. If such short cylindrical form of radium capsule be employed, the margins of the projected image can be determined through interpolation. That is, the length L may be considered as extending from a point approximately midway of the lines $p$ and $q$, denoting the outer margins of the pipe, and midway between the point $m$ and $n$, denoting the inner surface of the pipe, and reasonable accuracy maintained.

The present invention contemplates a form of radiant energy source which produces a sharper image than otherwise obtainable, as indicated in the above example of the use of a short cylindrical radium capsule. The effective focal spot of the cylindrical radium capsule is the distance between the innermost and outermost tangent rays measured in the upper tangent plane. By decreasing this distance, it is possible to decrease the surface delineations obtained on the film and narrow them to a closer line approximation.

Figure 6:
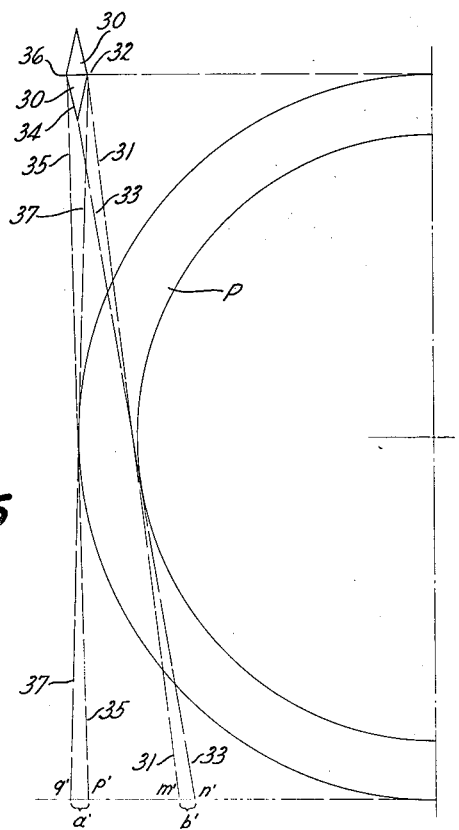
Figure 6 is a diagram illustrating the divergent tangent rays from a double conical radiation source striking a radiation sensitive member.

The effective focal spot may be reduced by making the radium capsule in conical form. As disclosed in Figure 6, the making of the capsule in the form of a narrow needle composed of two cones 30, 30 having a common base results in the obtaining of a more clearly defined projected image on the film. As seen in Figure 6, the rays 31 emanating from the inner end 32 of the base of the cones and tangent to the inner surface of the pipe marks a line $m'$ on the film surface. Similarly, an inner tangent ray 33 from the other side 34 of the capsule diverges with respect to the other tangent ray and marks the film surface at another point $n'$. However, the distance $b'$ between these two points has been substantially reduced as compared to the distance $b$ of the cylindrical capsule, as is evident from a comparison with the indications given in Figure 5. Similarly, the outer tangent ray 35 from the outermost surface 36 of the radium capsule marks an indication $p'$ on the film surface and another outer tangent ray 37 from the innermost surface 32 of the radium capsule provides another indication $q'$ on the film surface which is spaced from the first-mentioned indication $p'$. Here, again, the distance $a'$ between the two points $p'$, $q'$ is substantially less than the corresponding distance $a$ obtained through use of the cylindrical capsule. In other words, a much clearer and sharper projected image is obtainable on the film through the use of the conical arrangement.

Figure 7:
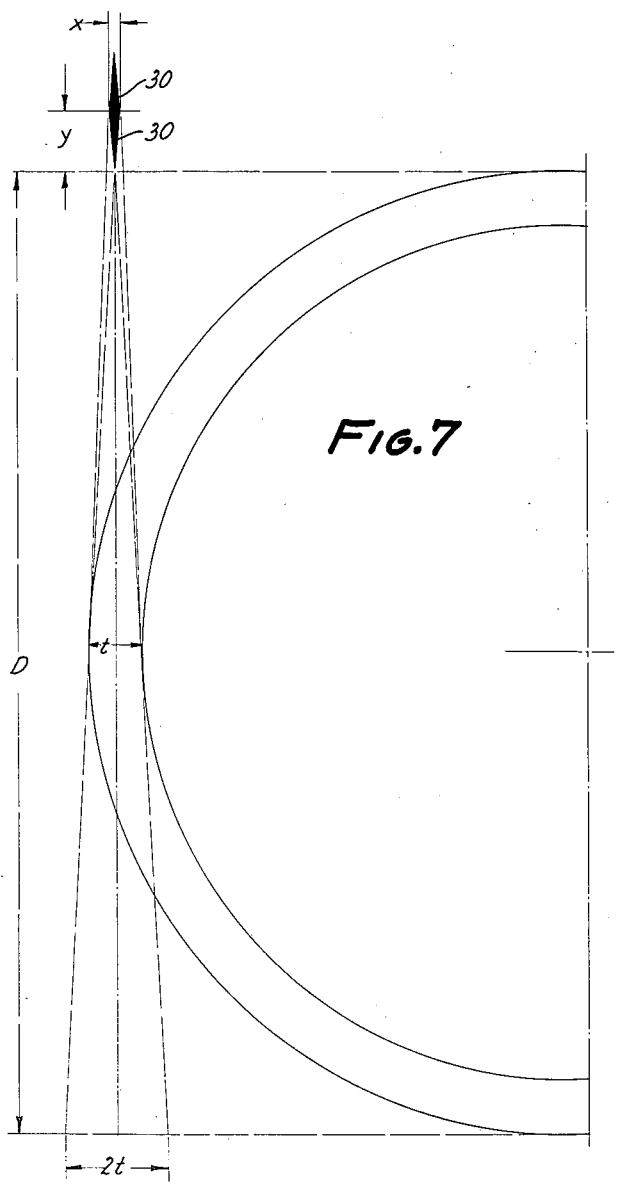
Figure 7 is a diagram of the theoretically optimum shape which a radium needle should assume in connection with measuring the thickness of a curved wall.

The theoretical dimensions of the radium capsule composed of two cones with abutting bases may be obtained from knowledge of the outside diameter of the pipe and its approximate wall thickness. As disclosed in Figure 7, if it is assumed that $t$=wall thickness=0.2″
$D$=outside pipe diameter=approximately 4 inches
$X$=the diameter of the common base of the cone, and
$Y$=the height of one cone, then by a similar triangular relationship, $$\frac{X}{Y}=\frac{2t}{D}$$

Using the particular figures referred to above and substituting for $t$ and $D$, $$\frac{X}{Y}=\frac{0.4}{4}=\frac{1}{10} \text{ or } X=\frac{1}{10}Y$$

In other words, the diameter of the common base of the capsule should be one-tenth of the height of one of its cones, or one-twentieth of the length of the radium needle.

Figure 8:
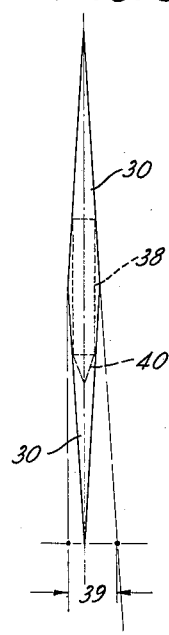
Figure 8 is a view on an enlarged scale of the radium needle disclosed in Figure 7.

Since it is difficult to produce and handle a radium needle of the theoretical shape disclosed, it is proposed to inscribe a cylinder 38 within the double cone so as to have the same length of effective focal spot 39, which will provide as sharp an image as the double cone shape (see Figure 8). In order to have the maximum quantity of radiation, a cylinder of maximum volume is inscribed in the double cone. If the ratio of diameter to height of the cone of 1 to 10 is the theoretical size of conical needle, the inscribed cylinder 38 of maximum volume would have a height to diameter ratio of about 3.5 to 4 to 1. If desired, a conical lower portion 40 may be appended to the cylinder, providing additional radioactive material without increasing the focal spot 39.

Referring now to Figures 9 and 10, these figures illustrate an important advantage of the apparatus and method of the present invention as compared to previous technique employing a source of penetrative radiation and a detector therefor as described hereinabove. In Figure 9 a pipe is shown and is designated by the reference letter P. Also shown is a sensitive photographic film S and also shown in broken lines is a source of radiation R which is above the plane of the paper. These elements are located relatively to one another as shown in Figures 1 and 3. The section of pipe cross hatched in Figure 9 is substantially a horizontal plane section taken parallel to the film S and approximately midway between R and S.

The wall of the pipe is designated generally by the reference numeral 50 and at the cross hatched section it is shown as having a small pit 51 and a large eroded area 52.

Referring now more particularly to Figure 10, the exosed and developed film is there shown which is generally designated by the reference letter S'. From the explanation hereinabove with reference to Figure 1, it will be apparent that the dark area 53 corresponds to the area to the left (as viewed in Figure 1) of the perpendicular tangent line 11; that a sharp line of demarcation B separates the dark area 53 from a light band or area L corresponding to the area L in Figure 1 which subtends the angle formed by the two outer and inner tangent lines; and that a sharp line of demarcation separates the light band L from a dark area 54. The band L is, of course, a photographic reproduction or projection of the crosshatched section shown in Figure 9 and the pit 51 and corroded area 52 are photographically reproduced or projected by dark intrusions 51a and 52a, respectively.

Figure 10 represents, therefore, a faithful photographic reproduction or projection of a substantial section, e.g., six inches or more, of pipe wall. Such photographs faithfully show the relative locations, sizes and configurations of irregularities in the surface, including pits and deposits.

It will be apparent that, if a considerable length of film is employed, e.g., 12 or 15 inches, there will be a shading off of tones longitudinally of the film. However, this is not a factor of great importance and is not an impediment to the use of the present invention. The most important result is to be able to locate and to observe or measure the light band L and its irregularities, which can be done very readily.

It is, accordingly, apparent that a method and apparatus have been provided, which enable a pipe wall thickness to be determined accurately from the exterior of the pipe only. Comparatively sharp and distinct images are obtainable, which bear a direct relation to the actual pipe wall thickness, allowing the latter to be obtained approximately very quickly, and accurately through the use of suitable formulae, tables and charts, if desired.

It is a very important advantage of the method and apparatus of the invention that, as illustrated by Figures 9 and 10, it gives a direct pictorial representation of wall thickness of a pipe or the like, such that one can readily and instantly determine the condition of a pipe wall and the extent to which it has been eroded or solid deposits have accumulated thereon. It is a further very important advantage that a considerable length of pipe can thus be examined.

Referring again to Figures 9 and 10 and to the corresponding description hereinabove, it will be apparent that a picture of a five or six inch section of pipe wall is taken by a single exposure. An average 4 or 6 inch diameter pipe requires an exposure time of the order of five minutes to produce a picture of this character. By way of contrast, the prior method and apparatus referred to above, which employ a detector such as a Geiger counter, would require a tedious scanning and would require a much longer time. The tedious, time consuming scanning required by the prior method and apparatus is necessitated by the nondiscriminatory, "averaging" character of such method and apparatus. Suppose, for example that radiation is passed through a one inch section of pipe and impinges upon a detector element. The detector element "sees" all of the incident radiation without discrimination; hence visual or audible signal or record represents the average thickness throughout the one inch length which is scanned. Such "average" recording cannot reveal a small pit, say ¼" in diameter. To detect a small defect or irregularity requires scanning very small sections of pipe wall at a time.

The method and apparatus of the present invention provide a visual, accurate recording of a section several inches long with a single exposure of a few minutes.

While I have illustrated and described my invention in detail, it is to be understood that various changes may be made therein by those skilled in the art without departing from the invention as defined in the appended claims.

I claim:

1. Apparatus for photographing a pipe wall to provide a picture of a section of the pipe wall taken in a plane intersecting the pipe wall, said apparatus comprising: a radiation source and a sensitive photographic film; said radiation source emanating radiation which is capable of penetrating said pipe wall, which is absorbed by the pipe wall in accordance with the pipe wall thickness through which the radiation passes and which is capable of acting on said film to produce a latent image; said film being sensitive to said radiation; and means for supporting said radiation source and film on the same side of the pipe wall and for relating said source and film and a pipe so that the radiation source is located at approximately the intersection of two mutually perpendicular planes both tangent to the exterior of such pipe, and said film is parallel to one of said tangent planes on the opposite side of such pipe and extends for a greater width than the latent image of the pipe wall thickness thereon so that the geometric pattern formed on the film comprises a less exposed band bounded by two more exposed bands, said less exposed band being a projection of a plane section of the pipe wall and of irregularities therein.

2. Apparatus for photographing a pipe wall by passage of radiation through said wall from a source located outside the pipe to a film also outside of the pipe, said apparatus comprising a sensitive film and a source of radiation capable of passing through the pipe wall, said radiation being absorbed by the pipe wall in proportion to thickness of the wall through which the radiation passes, said radiation acting on said film to develop a latent image thereon; said apparatus comprising mounting means for holding the radiation source and the film on the outside of the pipe in relation to each other and to a pipe to form a latent image on the film which is a projection of a section of the pipe wall taken in a plane intersecting the pipe wall said radiation source being located at approximately the intersection of two mutually perpendicular planes both tangent to the exterior of such pipe, said projection being of substantially greater length than the thickness of the wall and showing irregularities in said wall section in approximately the same relative positions, shapes and magnitudes as exist in the wall section itself said film extending greater than the width of the latent image.

3. Apparatus for photographing a pipe wall by passage of radiation through said wall from a source located outside the pipe to a film also outside of the pipe, said apparatus comprising a sensitive film and a source of radiation capable of passing through the pipe wall, said radiation being absorbed by the pipe wall in proportion to thickness of the wall through which the radiation passes, said radiation acting on said film to develop a latent image thereon; said apparatus comprising mounting means for holding the radiation source at the intersection of two mutually perpendicular planes tangent to the pipe and for holding the film in a plane parallel to one of said tangent planes and on the opposite side of the pipe, to form a latent image on the film which is a projection of a section of the pipe wall taken in a plane intersecting the wall, said projection being of substantially greater length than the thickness of the wall and showing irregularities in the wall section in approximately the same relative positions, shapes and magnitudes as exist in the wall section itself said film extending greater than the width of the latent image.

4. A method of photographing a pipe which comprises providing a pipe and also a source of radiation and a film sensitive to said radiation, said radiation having the property of passing through the pipe but being absorbed thereby in proportion to wall thickness; supporting said radiation source at the intersection of two mutually perpendicular planes tangent to the pipe, and supporting said film on the opposite side of the pipe in a plane parallel to one of said tangent planes, and forming a latent image on the film which is a projection of a section of the wall located in a predetermined plane intersecting the wall and parallel to said film said film extending greater than the width of the latent image.

References Cited in the file of this patent

UNITED STATES PATENTS

| | | |
|---|---|---|
| 2,057,325 | Bouwers et al. | Oct. 13, 1936 |
| 2,349,429 | Herzog et al. | May 23, 1944 |
| 2,396,069 | Zapp | Mar. 5, 1946 |
| 2,399,650 | Moyer | May 7, 1946 |
| 2,486,902 | Wolf | Nov. 1, 1949 |
| 2,748,290 | Reichertz | May 29, 1956 |
| 2,812,440 | Hartman et al. | Nov. 5, 1957 |